US 8,135,029 B1
Mar. 13, 2012

(12) United States Patent
Vasudevan et al.

(10) Patent No.: US 8,135,029 B1
(45) Date of Patent: *Mar. 13, 2012

(54) METHOD AND APPARATUS FOR A HIGH-SPEED FRAME TAGGER

(75) Inventors: Velamur Krishnamachari Vasudevan, Karnataka (IN); Dinesh Annayya, Karnataka (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/192,318

(22) Filed: Aug. 15, 2008

Related U.S. Application Data (63) Continuation of application No. 10/327,524, filed on Dec. 20, 2002, now Pat. No. 7,420,975.

(51) Int. Cl.
  *H04J 3/16* (2006.01)
  *H04L 12/28* (2006.01)
(52) U.S. Cl. .................... 370/466; 370/395.5
(58) Field of Classification Search .. 370/395.5–395.54, 370/465–467, 469, 463, 359, 411, 419–420
See application file for complete search history.

(56) References Cited

U.S. PATENT DOCUMENTS

| | | | |
|---|---|---|---|
| 4,433,378 A | 2/1984 | Leger | |
| 4,841,526 A | 6/1989 | Wilson et al. | |
| 4,920,483 A | 4/1990 | Pogue et al. | |
| 4,965,794 A | 10/1990 | Smith | |
| 5,079,693 A | 1/1992 | Miller | |
| 5,182,651 A | 1/1993 | Kishi | |
| 5,291,586 A | 3/1994 | Jen et al. | |
| 5,319,648 A | 6/1994 | Bux et al. | |
| 5,386,412 A | 1/1995 | Park et al. | |
| 5,471,628 A | 11/1995 | Phillips et al. | |
| 5,825,770 A | 10/1998 | Coady et al. | |
| 5,844,923 A | 12/1998 | Condon | |
| 5,920,572 A | 7/1999 | Washington | |
| 5,930,830 A | 7/1999 | Mendelson et al. | |
| 5,964,835 A | 10/1999 | Fowler et al. | |
| 6,144,574 A * | 11/2000 | Kobayashi et al. | 365/49.1 |
| 6,347,097 B1 | 2/2002 | Deng | |
| 6,359,911 B1 | 3/2002 | Movshovich et al. | |
| 6,442,669 B2 | 8/2002 | Wright et al. | |
| 6,584,584 B1 | 6/2003 | Smith | |
| 6,640,297 B1 | 10/2003 | Banning et al. | |
| 6,654,383 B2 | 11/2003 | Haymes et al. | |
| 6,714,543 B1 | 3/2004 | Brueckheimer et al. | |
| 6,741,594 B1 * | 5/2004 | Tzeng et al. | 370/392 |
| 6,763,390 B1 | 7/2004 | Kovacevic et al. | |
| 6,957,309 B1 | 10/2005 | Gupta et al. | |
| 6,961,348 B2 | 11/2005 | Yu | |
| 7,035,335 B1 | 4/2006 | Iacobelli et al. | |
| 7,061,930 B2 | 6/2006 | Mizobata | |
| 7,069,407 B1 | 6/2006 | Vasudevan et al. | |
| 7,073,019 B2 | 7/2006 | Banerjee et al. | |

(Continued)

OTHER PUBLICATIONS

Finney et al., "Using a Common Barrel Shifter for Operand Normalization, operand alignment and operand unpack & pack in floating point", IBM TDB, vol. 29, No. 2, Jul. 1986.

(Continued)

*Primary Examiner* — Thai Hoang (57) ABSTRACT

A method is described including extracting protocol information from a received packet within a framer, comparing the protocol information in a first pass to predetermined values to produce a first result, and tagging the packet based on the set of results.

17 Claims, 6 Drawing Sheets

U.S. PATENT DOCUMENTS

| | | | |
|---|---|---|---|
| 7,088,732 | B2 | 8/2006 | Min |
| 7,324,562 | B1 | 1/2008 | Shankar et al. |
| 7,400,620 | B1 | 7/2008 | Verma |
| 7,420,975 | B1 | 9/2008 | Vasudevan et al. |
| 7,493,392 | B1 | 2/2009 | Ganagadharan |
| 2001/0008564 | A1* | 7/2001 | Hirao et al. .................. 382/253 |
| 2001/0049726 | A1 | 12/2001 | Comeau et al. |
| 2002/0009100 | A1 | 1/2002 | Raghavan et al. |
| 2002/0191543 | A1* | 12/2002 | Buskirk et al. ............. 370/230.1 |
| 2003/0120664 | A1 | 6/2003 | Davidson et al. |
| 2003/0169735 | A1 | 9/2003 | Johnson et al. |
| 2004/0064589 | A1 | 4/2004 | Boucher et al. |
| 2004/0117584 | A1 | 6/2004 | Banerjee |
| 2004/0196847 | A1 | 10/2004 | Kuwabara |

OTHER PUBLICATIONS

Kohler et al., "Programming Language Optimization for Modular Router Configurations", ACM SIGOPS Operating Systems Review, vol. 36, 30, 37, Issue 5, 5, 10, Oct. 2002.

Imrich Chlamtac et al., "Scalable WDM Access Network Architecture Based on Photonic Slot Routing" IEEE/ACM Transactions on Networking (TON), vol. 7 Issue 1, pp. 1-9, Feb. 1999.

Nilam Ruparelia, Delivering Ethernet Over Sonet Using Virtual Concatenation, CommsDesign, Feb. 25, 2002, 8 pages, www.commsdesign.com/story/OEG20020225S0078.

Louis E. Frenzel, Programmable Framer Chip Improves OC-48 Efficiency, Electronic Design, Apr. 16, 2001, 4 pages.

Michael Timothy Moore, Filling the WAN-Communications-Line Card, designfeature, Apr. 18, 2002, 5 pages, www.Ednmag.com.

U.S. Appl. No. 10/324,308, Notice of Allowance mailed May 6, 2005, 6 pages.

U.S. Appl. No. 10/317,874, Notice of Allowance mailed Feb. 14, 2006, 5 pages.

U.S. Appl. No. 10/327,456, Notice of Allowance mailed Feb. 23, 2006, 9 pages.

U.S. Appl. No. 10/327,250, Notice of Allowance mailed Sep. 11, 2007, 9 pages.

U.S. Appl. No. 10/327,232, Notice of Allowance mailed Jul. 29, 2008, 11 pages.

U.S. Appl. No. 10/327,524, Notice of Allowance mailed May 2, 2008, 12 pages.

U.S. Appl. No. 10/325,415, Notice of Allowance mailed Feb. 6, 2008, 7 pages.

U.S. Appl. No. 10/325,555, Final Office Action mailed Jul. 11, 2008, 14 pages.

USPTO Non-Final Rejection for U.S. Appl. No. 10/327,524 dated Nov. 2, 2007; 10 pages.

USPTO Non-Final Rejection for U.S. Appl. No. 10/327,524 dated Jan. 11, 2007; 10 pages.

USPTO Notice of Allowance for U.S. Appl. No. 10/327,232 dated Oct. 31, 2008; 10 pages.

USPTO Non-Final Rejection for U.S. Appl. No. 10/327,232 dated Jan. 11, 2008; 19 pages.

USPTO Final Rejection for U.S. Appl. No. 10/327,232 dated Aug. 21, 2007; 15 pages.

USPTO Non-Final Rejection for U.S. Appl. No. 10/327,232 dated Mar. 22, 2007; 14 pages.

USPTO Non-Final Rejection for U.S. Appl. No. 10/327,232 dated Jun. 20, 2006; 10 pages.

USPTO Final Rejection for U.S. Appl. No. 10/327,232 dated Dec. 4, 2006; 12 pages.

USPTO Notice of Allowance for U.S. Appl. No. 10/327,456 dated Feb. 23, 2006; 7 pages.

USPTO Non-Final Rejection for U.S. Appl. No. 10/327,456 dated Nov. 15, 2005; 9 pages.

USPTO Miscellaneous Action for U.S. Appl. No. 10/327,456 dated Feb. 11, 2003; 1 page.

USPTO Notice of Allowance for U.S. Appl. No. 10/327,250 dated Sep. 11, 2007; 6 pages.

USPTO Non-Final Rejection for U.S. Appl. No. 10/327,250 dated Apr. 12, 2007; 5 pages.

USPTO Requirement for Restriction for U.S. Appl. No. 10/327,250 dated Jan. 4, 2007; 5 pages.

USPTO Notice of Allowance for U.S. Appl. No. 10/324,308 dated May 6, 2005; 6 pages.

USPTO Non-Final Rejection for U.S. Appl. No. 10/324,308 dated Jan. 24, 2005; 7 pages.

USPTO Miscellaneous Action for U.S. Appl. No. 10/324,308 dated Feb. 6, 2003; 1 pages.

USPTO Notice of Allowance for U.S. Appl. No. 10/317,874 dated Feb. 14, 2006; 4 pages.

USPTO Advisory Action for U.S. Appl. No. 10/317,874 dated Jan. 19, 2006; 3 pages.

USPTO Final Rejection for U.S. Appl. No. 10/317,874 dated Nov. 2, 2005; 8 pages.

USPTO Non-Final Rejection for U.S. Appl. No. 10/317,874 dated May 17, 2005; 6 pages.

USPTO Miscellaneous Action for U.S. Appl. No. 10/317,874 dated Jan. 29, 2003; 1 page.

USPTO Notice of Allowance for U.S. Appl. No. 10/325,415 dated Feb. 6, 2008; 6 pages.

USPTO Final Rejection for U.S. Appl. No. 10/325,415 dated Dec.12, 2007; 12 pages.

USPTO Non-Final Rejection for U.S. Appl. No. 10/325,415 dated Jun. 27, 2007; 9 pages.

USPTO Notice of Allowance for U.S. Appl. No. 10/325,555 dated Jul. 22, 2010; 4 pages.

USPTO Non-Final Rejection for U.S. Appl. No. 10/325,555 dated Jan. 5, 2010; 14 pages.

USPTO Final Rejection for U.S. Appl. No. 10/325,555 dated Jul. 20, 2009; 14 pages.

USPTO Non-Final Rejection for U.S. Appl. No. 10/325,555 dated Dec. 23, 2008; 14 pages.

USPTO Advisory Action for U.S. Appl. No. 10/325,555 dated Oct. 20, 2008; 3 pages.

USPTO Final Rejection for U.S. Appl. No. 10/325,555 dated Jul. 11, 2008; 14 pages.

USPTO Non-Final Rejection for U.S. Appl. No. 10/325,555 dated Jan. 11, 2008; 14 pages.

USPTO Advisory Action for U.S. Appl. No. 10/325,555 dated Oct. 16, 2007; 3 pages.

USPTO Final Rejection for U.S. Appl. No. 10/325,555 dated Jun. 28, 2007; 10 pages.

USPTO Non-Final Rejection for U.S. Appl. No. 10/325,555 dated Jan. 11, 2007; 9 pages.

USPTO Miscellaneous Action for U.S. Appl. No. 10/325,555 dated Feb. 5, 2003; 1 page.

SearchNetworking.com Definitions, "Frame," printed on Feb. 13, 2008; 3 pages.

USPTO Notice of Allowance for U.S. Appl. No. 10/327,524 dated May 2, 2008; 8 pages.

* cited by examiner

METHOD AND APPARATUS FOR A HIGH-SPEED FRAME TAGGER

RELATED APPLICATION

This application is a continuation of Ser. No. 10/327,524 filed Dec. 20, 2002 now U.S. Pat. No. 7,420,975, which is hereby incorporated by reference.

FIELD

Embodiments of the invention generally relate to methods and apparatuses used in communications and more specifically to methods and hardware for communications over long-range networks.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor. In particular, this may include taking data bits of a series of bytes and reorganizing them into a form including only data bits. A similar problem may occur at a byte-level, wherein some bytes of a group of bytes are data bytes, and other bytes are effectively control bytes which need to be parsed out of data.

Determining which bytes received are control or data bytes often is the function of a network processor within a system, which is also charged with the task of processing all data bytes. As data bytes tend to be the largest portion of network traffic, the network processor has a heavy workload within the system. Moreover, network processors typically do not run at line speed (the speed at which data is transferred) when processing, because of the heavy workload from processing data along with the demand to determine what type of control or data bytes are received.

BRIEF DESCRIPTION OF THE DRAWINGS

The present invention is illustrated by way of example and not limitation in the accompanying figures.

DETAILED DESCRIPTION

A method and apparatus for a high-speed frame tagger is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the invention relates in various embodiments to a method or apparatus for a multi-pass comparison of contents of a packet to various single or multiple predetermined values. The comparison may be implemented such that comparisons to early words in the packet (first words of a protocol section of a packet for example) determine whether later words need to be compared. However, the comparisons may be carried out in parallel or nearly parallel (as words arrive), such that the delay involved is not one clock cycle per word compared for example.

In one embodiment, the invention is a method. The method includes extracting protocol information from a received packet within a framer. The method also includes comparing the protocol information in a first pass to predetermined values to produce a first result. The method further includes tagging the packet based on the first result.

The method may further include determining an offset within the packet at which the protocol information may be found. The method may also include skipping a number of bytes within the packet corresponding to the offset to find the protocol information. The method may further include comparing the protocol information in a second pass to predetermined values to produce a second result. The first and second results form a set of results, and the tagging is based on the set of results.

In an alternate embodiment, the invention is an apparatus. The apparatus includes a network processor interface suitable for coupling to a network processor. The apparatus further includes a central processor interface suitable for coupling to a central processor. The apparatus also includes a protocol determination logic block to determine a protocol type of data in a packet and steer the packet to either the central processor interface or the network processor interface based on the protocol type of data.

The protocol logic block may also include a protocol extractor to extract a location of protocol information of the packet. The protocol logic block may further include a data register to store protocol information of the packet. The protocol logic block may also include a comparator to compare contents of the data register to predetermined values. The protocol logic block may further include a tag selector to select a tag based on a result of the comparator. The protocol logic block may also include a protocol code memory to store the predetermined values.

Furthermore, the network processor interface, central processor interface, and protocol determination logic block may be included in a framer. The apparatus may also include a central processor coupled to the central processor interface of the framer. The apparatus may further include a network processor coupled to the network processor interface of the framer. The apparatus may also include a physical link layer coupled to the framer. The apparatus may further include a software stack coupled to the framer. The apparatus may also include a host system coupled to the software stack and the network processor.

In another alternate embodiment, the invention is an apparatus. The apparatus includes means for extracting protocol information from a received packet within a framer. The apparatus also includes means for comparing the protocol information in a first pass to predetermined values to produce a first result. The apparatus further includes means for tagging the packet based on the first result.

Figure 1:
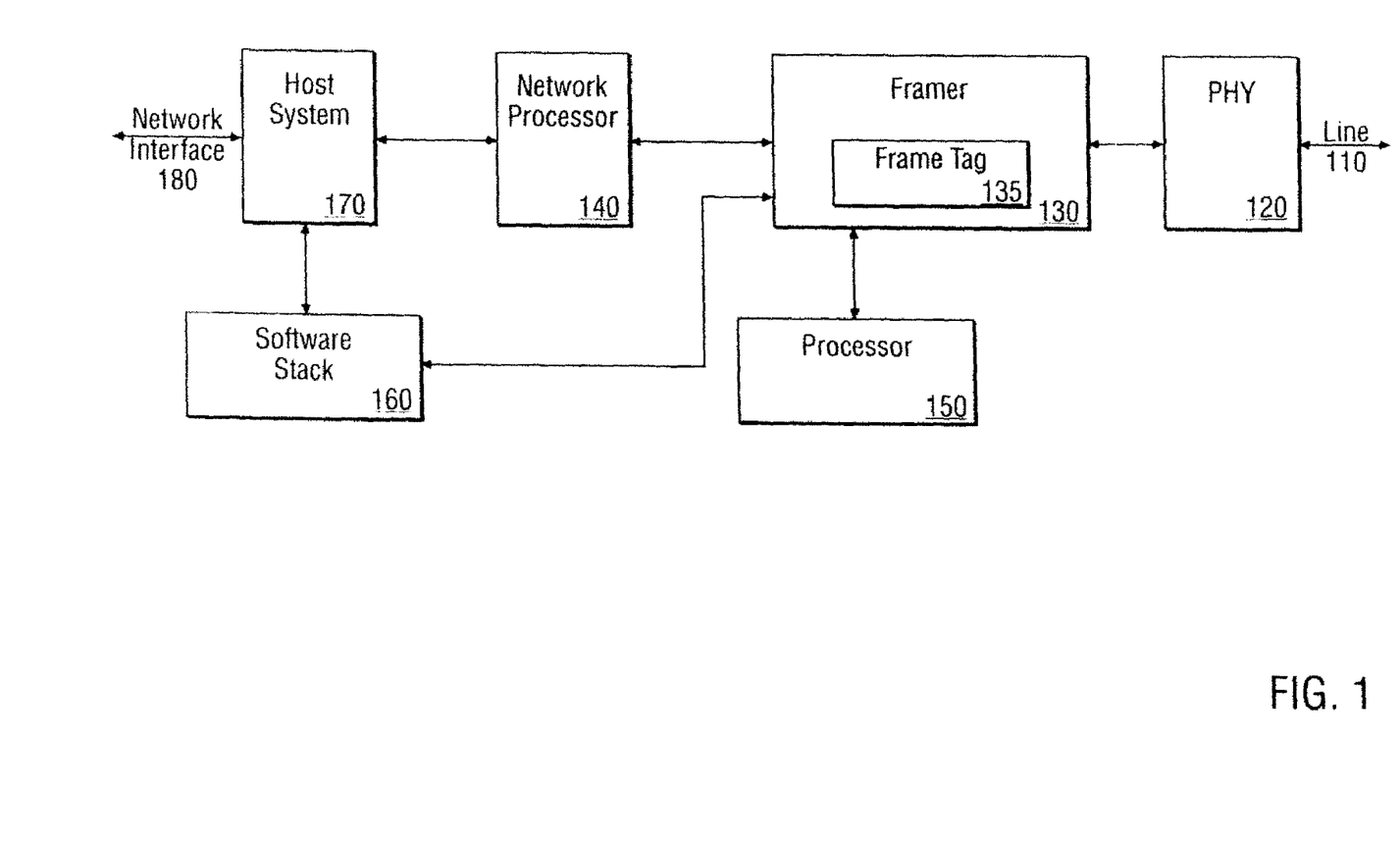
FIG. 1 illustrates an embodiment of a system in block diagram form.

Illustrations of various embodiments of the invention are provided, but the illustrations of the Figures described are not limiting on the invention, so much as they exemplify some embodiments of the invention. FIG. 1 illustrates an embodiment of a system in block diagram form. Data is received and sent on line 110, which may be a fiber optic cable or twisted-pair copper wire for example. Coupled to line 110 is physical layer 120, which translates signals from line 110 into a form suitable for use by circuitry, such as through optoelectronic transformation or level-shifting for example. Coupled to physical layer 120 is framer 130, which operates to frame or deframe data for transmission or reception, and which includes frame tag module 135. Coupled to framer 130 is network processor 140, which may be used to process data for transmission or reception. Coupled to network processor 140 is host system 170, which may transfer data between network processor 140 and a network interface 180 which couples to an internal network. Also coupled to framer 130 is processor 150, which may operate to control framer 130 and interact with frame tag module 135. Furthermore, coupled to both framer 130 and host system 170 is software stack 160, which may be used to store control packets for handling by host system 170.

In one embodiment, framer 130 may be expected to use frame tag module 135 to tag incoming packets, and then framer 130 may be expected to steer those packets to particular destinations depending on the tags from frame tag module. Alternatively, frame tag module 135 may generate tags which are passed on to network processor 140. Network processor 140 may then use those tags to determine what type of packet they accompany.

Figure 2:
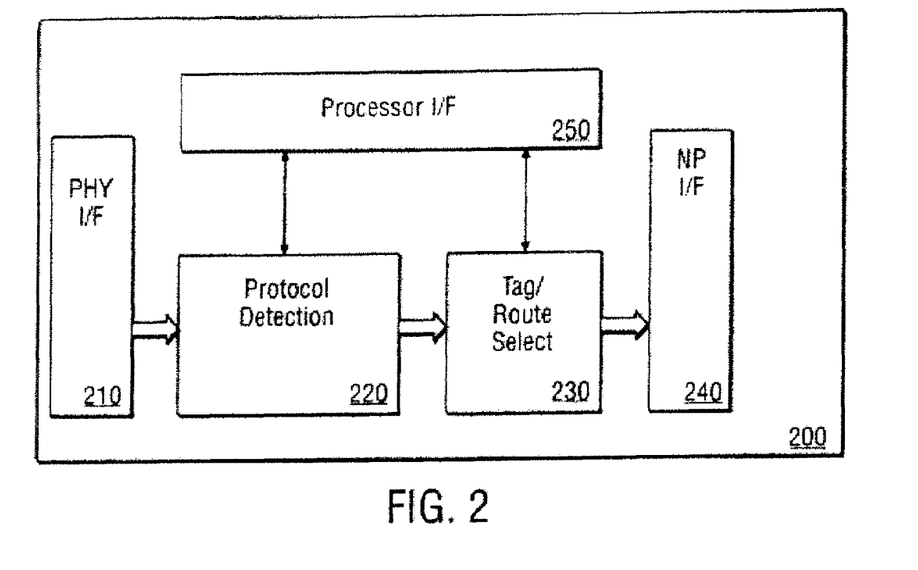
FIG. 2 illustrates an embodiment of a frame tag apparatus in block diagram form.

FIG. 2 illustrates an embodiment of a frame tag apparatus in block diagram form. In one embodiment, data is received, examined at line speed by high speed dedicated logic, tagged based on results of this examination, and then the tags and the data are provided to a network processor for further processing. Frame tag module 200 is illustrated, including physical interface 210, protocol detection 220, tag select 230, network processor interface 240 and processor interface 250. Preferably, physical interface 210 receives data from a physical link layer component. Similarly, preferably network processor interface 240 provides data to a network processor within a surrounding system. However, these interfaces may be incorporated within a larger component such as a framer, of which frame tag module 220 is only a part. Moreover, the results of the frame tag module's 200 operations may be used within a component rather than provided directly to an external component, such that tags discussed below may be used in a framer to steer data elsewhere, rather than sending the tags to a network processor for example.

Protocol detection 220 is a logic block including dedicated logic which determines what type of bytes (control, data, and various subclassifications) is being received. The output of this logic is used by tag select 230 to determine which tags should accompany the data. Preferably, the tags are predetermined values of one to several bits which may be used within the system to indicate a specific type of information in a packet, such as a control packet for use by a host system or a data packet for use in transporting data. Moreover, in some embodiment, tag select 230 also includes route selection logic which determines what datapath should be used by a packet as it traverses within the component or within the system as a whole.

Each of protocol detection 220 and tag select 230 are controlled in part through processor interface 250. In one embodiment, processor interface 250 is suitable for coupling to a processor which controls a framer and other parts of a line card, but does not actually process data itself. In alternate embodiments, other control devices, such as a host system processor, may be coupled to the processor interface 250 to control some aspects of operation of the protocol detection 220 and tag select 230 logic blocks. Processor interface 250 may be used to supply control codes to protocol detection 220, and these control codes may then be compared to values found in received packets to determine the type of packets. Similarly, processor interface 250 may be used to supply tag values to tag select 230, and these tag values may then be used throughout the system to identify the type of a packet.

Figure 3:
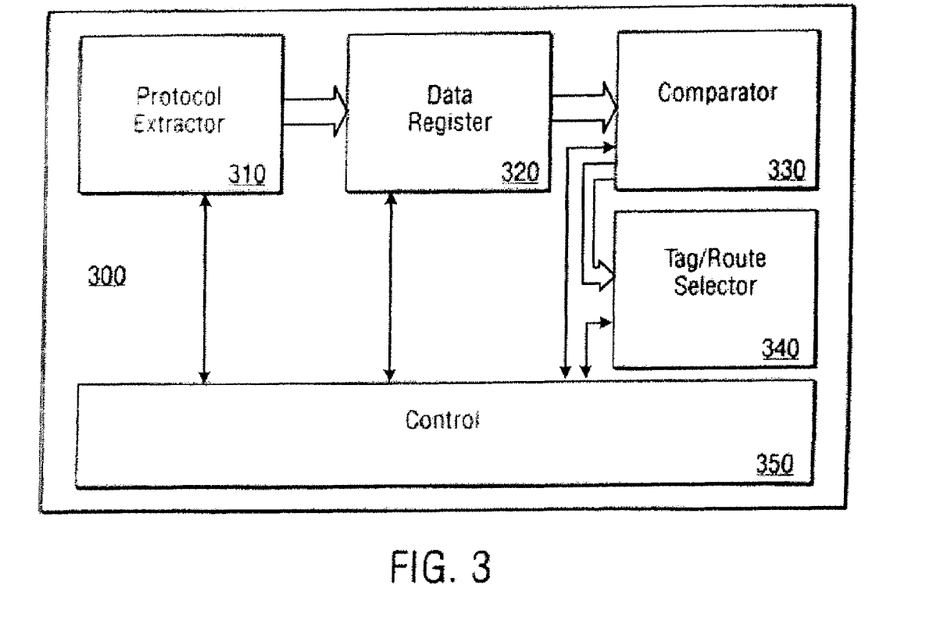
FIG. 3 illustrates an alternate embodiment of a frame tag apparatus in block diagram form.

Various different implementations of a frame tag module may be used. FIG. 3 illustrates an alternate embodiment of a frame tag apparatus in block diagram form. In this embodiment, protocol data is extracted from a packet at line speed, the protocol data is placed in a register, and the protocol data is compared to predetermined values. Based on results of the comparison, the packet is then tagged as belonging to a certain type of packets, such as control or data packets for example.

Frame tag module 300 includes protocol extractor 310, data register 320, comparator 330, tag selector 340 and control block 350. Control block 350 controls operations of each of protocol extractor 310, data register 320, comparator 330 and tag selector 340. Protocol extractor, in one embodiment, examines a packet to determine a location of protocol information within the packet, and then extracts that protocol information from the packet. In turn, the protocol information is stored in data register 320, allowing for easy access to the protocol information by comparator 330. Comparator 330 compares the protocol information with predetermined values and indicates if any of the predetermined values match the protocol information. Tag selector 340 uses the indication from comparator 330 to determine which tag should be applied to the packet, and that tag is then available for any components which receive the packet after its use by the frame tag module 300.

Predetermined values used by the comparator 330 may be provided by control 350, or through an interface (not shown) with another component. Similarly, the tags provided by tag selector 340 may be provided to tag selector 340 from control block 350, or through an interface (not shown) to another component. Moreover, tag selector 340 may have the larger purpose of effectively indicating which of several datapaths a packet will take within a system, either based on the tag supplied, or based on specific information provided by tag selector 340 aside from a specific tag value.

Figure 4:
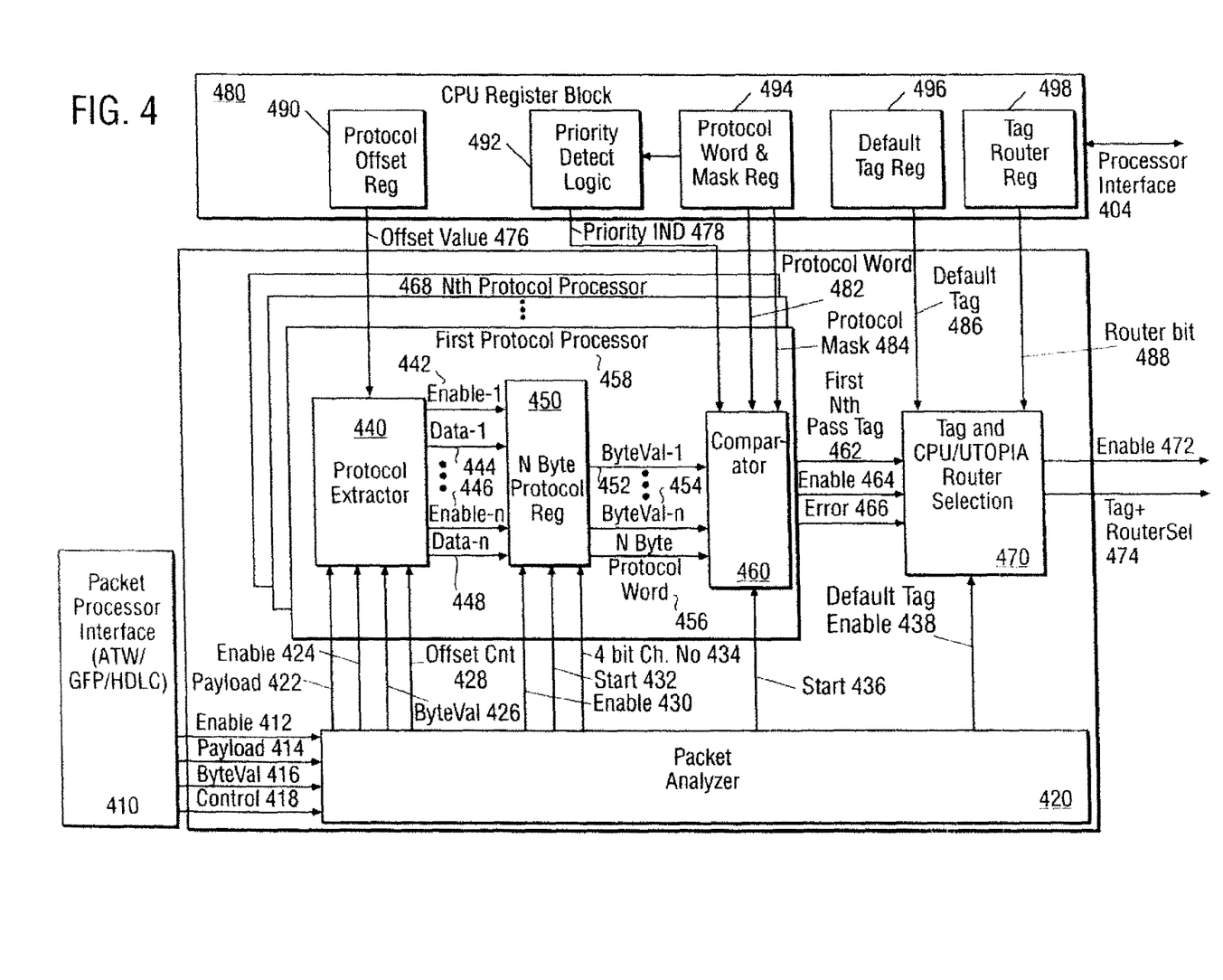
FIG. 4 illustrates another alternate embodiment of a frame tag apparatus in block diagram form.

A more detailed illustration of one embodiment may serve to further indicate how one may implement a high speed frame tagger. FIG. 4 illustrates another alternate embodiment of a frame tag apparatus in block diagram form. Data is received and analyzed, with a protocol information section extracted from a packet, stored into a register, compared with predetermined (programmable) values, and then with a tag provided based on the comparison.

Packet processor interface 410 interfaces with an external component relative to the frame tagger, providing the packet upon which to operate (as payload 414) along with control signals enable 412, byte value 416 and control 418. Packet analyzer 420 receives the packet initially and provides various portions of the packet and control signals to other subcircuits. CPU register block 480 similarly provides various information and control signals to the subcircuits and interfaces through interface 404 with an external processor (not shown). First protocol processor 458, along with Nth protocol processor 468 and intermediate protocol processors each perform a process which may be similar to, or different from processes performed by other protocol processors.

In general, each protocol processor is used to compare a word, field, or other portion of a packet to an expected value in a lookaside manner (the comparison occurs at line speed, as the packet passes through). The total number of protocol processors needed for a packet passing through the interface is decided based on number of different set of relevant fields needs to be analyzed on the packet. The number (N) of protocol processors in a given implementation or embodiment may thus be bounded by the number of individual comparisons that will need to be performed in this manner, with each protocol processor dedicated to a preselected comparison or set of comparisons. Moreover, the comparisons may need to be altered depending on the type of packet encountered, such that a protocol processor may perform a first type of comparison for a first type of packet and a second type of comparison for a second type of packet. In some embodiments, this may be implemented by having the protocol processor always perform all potential comparisons.

First protocol processor 458 is described further herein, and other protocol processors may be understood as similar. Protocol extractor 440 receives payload 422, enable 424, byte value 426 and offset control signals 428, and uses these signals and data to extract a protocol information section from the payload 422. Protocol extractor 440 also receives offset value 476 from protocol offset register 490. This protocol information section will have a predetermined number of bytes (which may be encoded in the packet or fixed). The bytes (or words) of the protocol information section are provided separately as data 1 signal 444 through data n signal 448, along with corresponding enable signals 442 through 446.

Protocol register 450 receives the signals/data from protocol extractor 440 and maintains this information for use by comparator 460 under the control of packet analyzer 420 (through enable 430, start 432 and Channel number 434 signals). Protocol register 450 may be implemented to have different storage areas for different channels or virtual channels, depending on how the surrounding system is expected to perform.

Comparator 460, responsive to start signal 436, compares the data available from protocol register 450 (available as byte value 1 452 through byte value n 454 and protocol word 456 signals) to expected or predetermined values, either single values or a set of values for each word/byte. Comparator 460 also receives priority indication 478 from priority detection logic 492 and receives protocol word 482 and protocol mask 484 from protocol word and mask register 494. In one embodiment, protocol mask 484 and protocol word 482 allow for a selective comparison of the data from protocol register 450 to the protocol word 482 (the predetermined value).

Tag and Route selection 470 receives results from comparator 460, which may include tag 462 (the tag selected for the packet), enable signal 464 (indicating the comparison is complete) and error signal 466. Error signal 466 may be a 1 bit or larger signal indicative of some form of error prior to use of any data by tag and route selection 470, and may thus be used to pass along an indication that the established tag may not be reliable. Tag and route selection 470 also receives default tag enable signal 438 (which enables a default tag if no other tag is appropriate), default tag signal 486 from default tag register 496 (the storage location for the default tag value) along with router bit 488 from tag router bit storage location 498. Tag and route selection 470 use the tag signal(s) that are a result of comparator 460 to determine where a packet should be routed to (which datapath for example) and what the tag for the packet should be. Enable signal 472 and tag and router selection signal 474 are then made available to other components as a signal indicating a useful result (enable 472) and the actual tag and route selection for the packet (tag and router signal 474).

Figure 5:
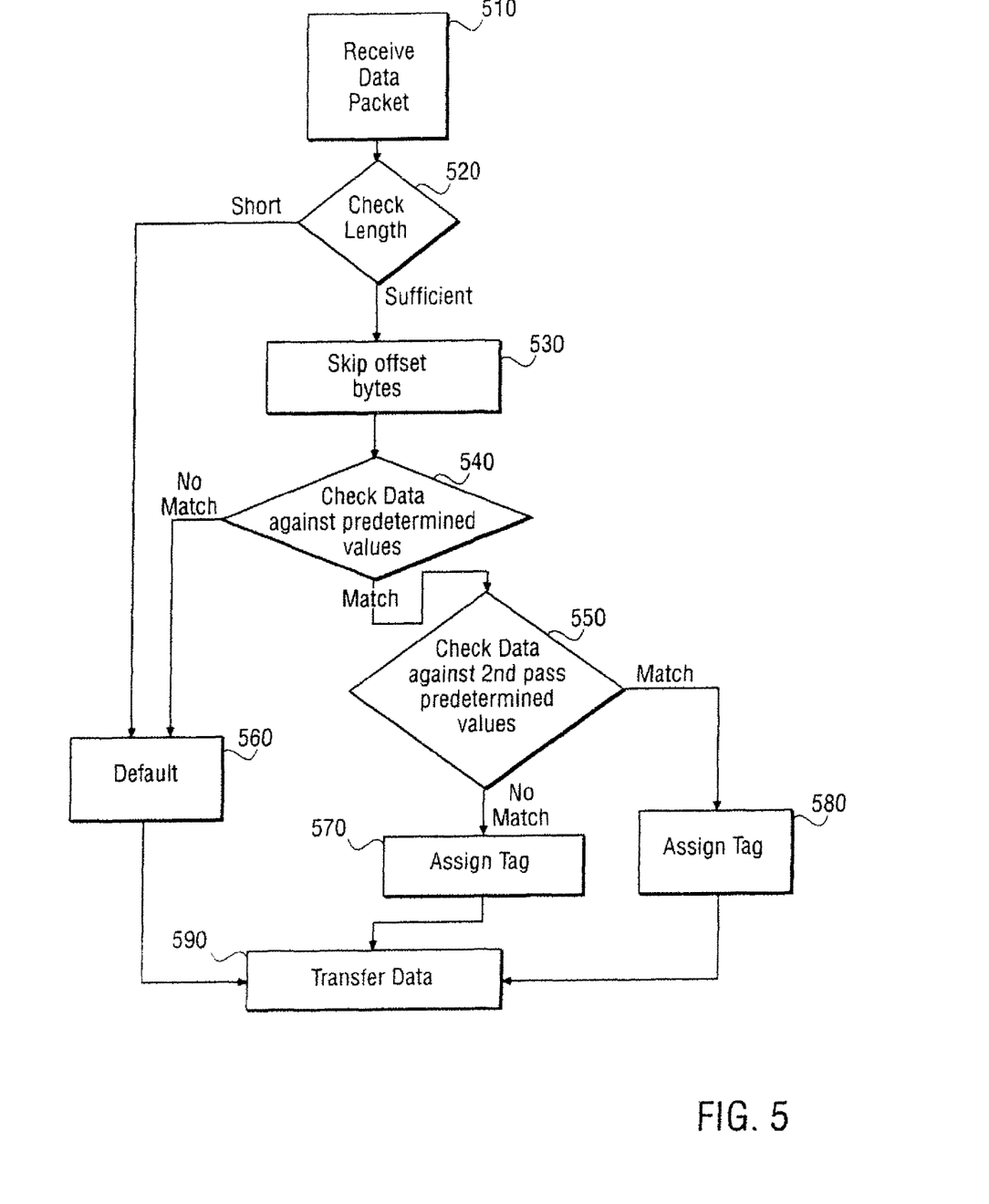
FIG. 5 illustrates an embodiment of a method of frame tagging in flow diagram form.

As various embodiments of apparatuses may be used, various methods of practicing the invention may be carried out. FIG. 5 illustrates an embodiment of a method of frame tagging in flow diagram form. In general, the embodiment involves an initial check of the packet, finding protocol information, checking the protocol information, and then assigning a tag based on results of the previous parts of the method.

At block 510, a data packet is received. Preferably, the method occurs in parallel with reception of the packet. Moreover, while a packet may be referred to as having data or control information, all packets may be referred to in some sense as data packets, as all packets may be treated the same (as a packet containing data to be transferred) in some parts of any communications system. Thus, as the method occurs, portions of the packet initially received at block 510 may continue to be received. If the method operates at line speed with the data, then this will likely be the case.

At block 520, the length of the packet is checked. If it is a very short packet, checking its type on the fly may not be possible in some embodiments, and the process moves to block 560, where a default tag is assigned. Typically, a default tag may be an indication that the contents of the packet have not been determined, rather than an indication of a specific type of packet. If the packet is of sufficient length to be checked, the process moves to block 530, and the offset bytes (initial bytes in a packet prior to protocol information) are skipped. At block 540, the actual protocol information is checked against predetermined values. If no match is found, the packet type has not been determined, and the process proceeds to block 560.

If a match has been found (at block 540), a second pass comparison may be necessary. At block 550, a second pass comparison (such as checking an additional part of the protocol information beyond that checked at block 540 for example) occurs. If a match is found at block 550, then at block 580, a tag appropriate to the matches at both blocks 540 and 550 is assigned. If no match is found at block 550, then a tag appropriate to the match at block 540 and lack of a match at block 550 is assigned at block 570. From blocks 560, 570 and 580, the method proceeds to transfer of data at block 590, wherein the packet and any associated tags are provided to components associated with a system using the method of this embodiment.

Figure 6:
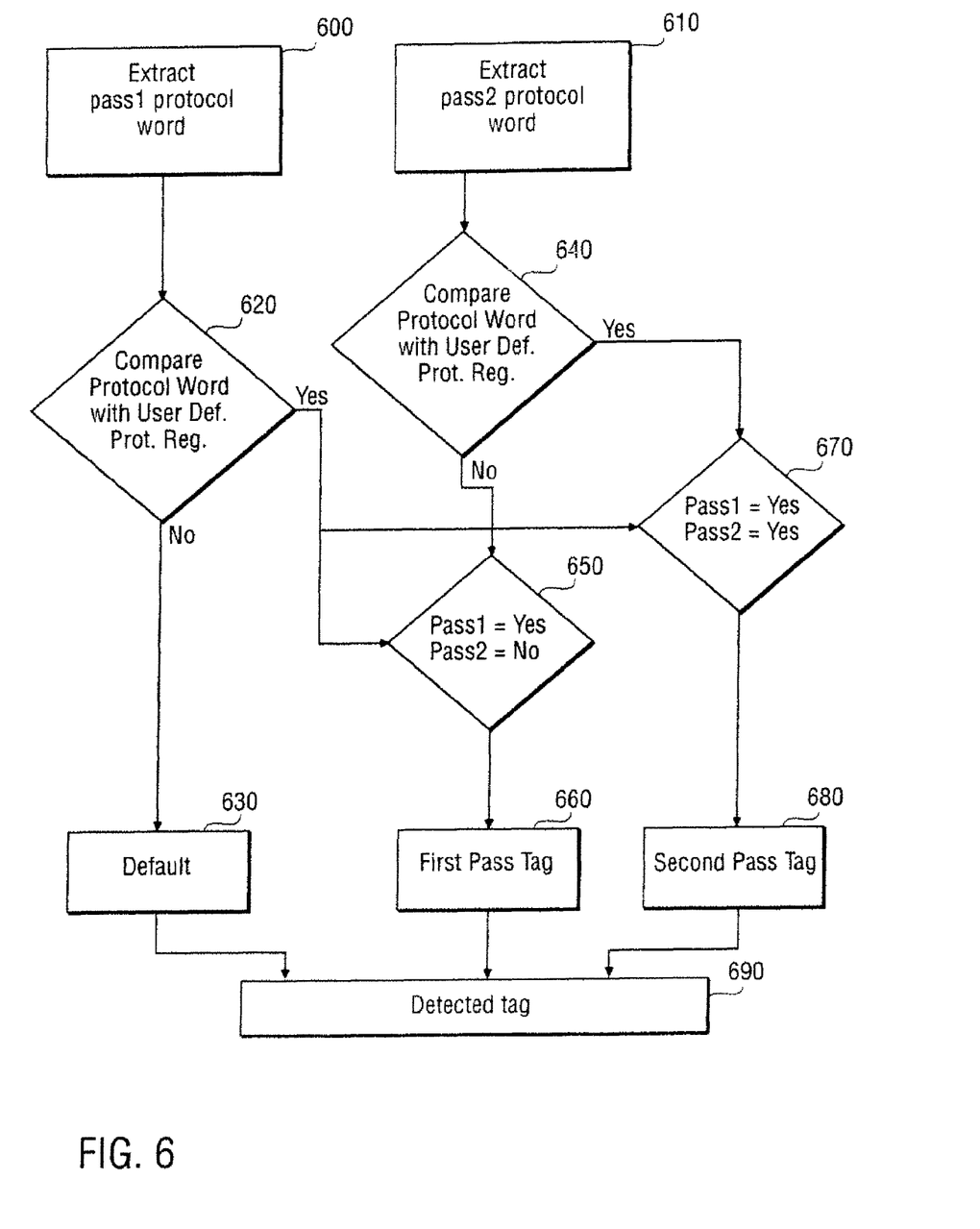
FIG. 6 illustrates an alternate embodiment of a method of frame tagging in flow diagram form.

Various alternative methods may also be implemented, including methods utilizing more parallelism than is literally illustrated with respect to FIG. 5. FIG. 6 illustrates an alternate embodiment of a method of frame tagging in flow diagram form. In general, the method attempts to perform multiple comparisons in parallel, thus matching a packet to an expected protocol of a group of expected protocols. However, the method also hierarchically compares portions of a packet, such that if the highest priority comparison (such as a first pass comparison for example) fails, the other comparisons do not affect the result.

At block 600, the first pass protocol word of a packet is extracted. At block 620, this first pass protocol word is compared with a user defined or pre-determined protocol value, to determine whether the first pass protocol word of the packet matches an expected value. If not, the type of packet is not one that is being scanned for, and at block 630, the packet is tagged as a default packet, and the process moves to block 690 where the detected tag is made available.

If the first pass protocol word is a match (either to a single value or to one of a set of values), then parallel portions of the method come into play. At block 610, the second pass protocol word is extracted, and at block 640, the second pass protocol word is compared to a user defined or pre-determined protocol value, to determine whether the second pass protocol word of the packet matches an expected value. If no match is found, at block 650, this is acknowledged as a match for the first pass and no match for the second pass. Correspondingly, at block 660, the tag appropriate for the first pass match is provided, and the process then proceeds to block 690. If a match occurs at block 640, the process moves to block 670, and the process recognizes that both the first and second passes had matches. Then, at block 680, the tag appropriate to the second pass match is provided as the applicable tag. Ultimately, regardless of the comparison results, the process ends for a given packet at block 690.

As indicated, the matches available for a given pass may be a single predetermined or programmed value, or one of a set of values. Thus, a range of values may be specified for a given pass. Typically, each word to be compared from the packet will be in a compact portion of the packet, such that the various words to be compared will be available nearly simultaneously. However, the process works by using the first matches to trigger use of later matches, such that if the first pass protocol word of the packet does not match, the tag is the default tag, regardless of potential matches in the second pass protocol word. This may be varied, if appropriate.

Figure 7:
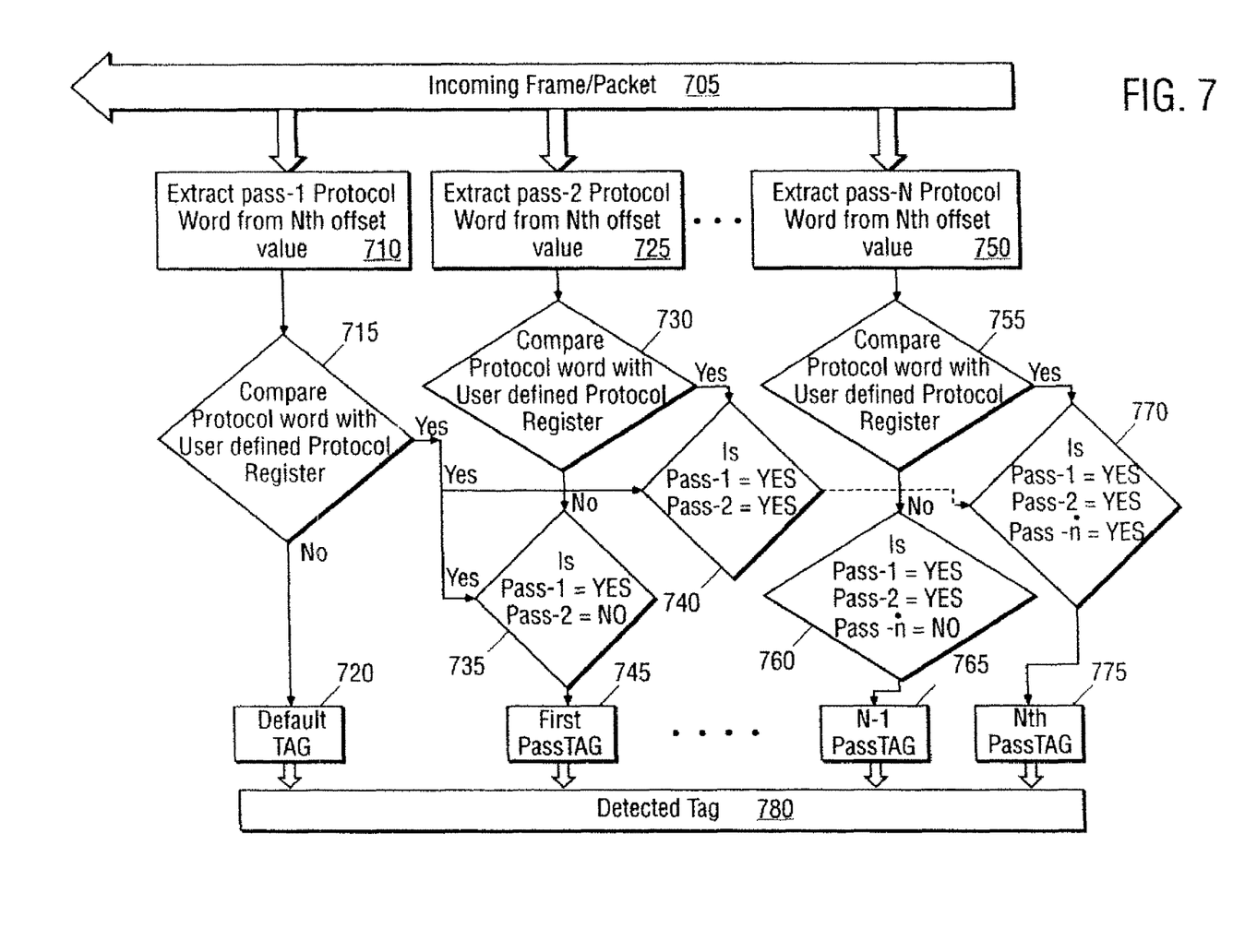
FIG. 7 illustrates another alternate embodiment of a method of frame tagging in flow diagram form.

Examination of FIG. 6 will allow one to envision a multiple pass comparison beyond two passes. FIG. 7 illustrates another alternate embodiment of a method of frame tagging in flow diagram form. The embodiment of FIG. 7 provides for n passes of comparison, each having some control over "succeeding" passes without requiring a delay from one pass to the next.

At block 710, the first pass protocol word of a packet is extracted. At block 715, this first pass protocol word is compared with a user defined or pre-determined protocol value, to determine whether the first pass protocol word of the packet matches an expected value. If not, the type of packet is not one that is being scanned for, and at block 720, the packet is tagged as a default packet.

If the first pass protocol word is a match then parallel portions of the method come into play. At block 725, the second pass protocol word is extracted, and at block 730, the second pass protocol word is compared to a user defined or pre-determined protocol value, to determine whether the second pass protocol word of the packet matches an expected value. If no match is found, at block 735, this is acknowledged as a match for the first pass and no match for the second pass. Correspondingly, at block 745, the tag appropriate for the first pass match is provided.

If a match occurs at block 730, this is recognized at block 740, and the process moves, potentially along to blocks 760 and 770. In the meantime, at block 750, a nth pass protocol word is extracted from the packet, and at block 755, a determination is made as to whether a match to the nth pass protocol word has occurred. Any number of passes may thus be implemented. In the nth pass, block 760 is used to recognize that no match on pass n occurred, and that the pass n−1 tag should be used at block 765. Likewise, at block 770, recognition of matches on all passes occurs, and the pass n tag of block 775 is used. Ultimately, regardless of the comparison results, the process ends for a given packet at block 780, with the appropriate tag (of blocks 720, 745, 765, 775 or other un-illustrated blocks) made available as a result of the process.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 4 may be integrated into components, or may be subdivided into components. Similarly, the blocks of FIG. 5 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method, comprising:
   extracting protocol information from a received packet within a framer;
   comparing the protocol information in a first pass to predetermined values to produce a first result;
   and tagging the packet based on the first result if the first result is negative;
   the method further comprising comparing the protocol information in a second pass to predetermined values, if the first result is positive, to produce a second result, wherein the first and second results form a set of results.

2. The method of claim 1, further comprising comparing the protocol information in a third pass to predetermined values to produce a third result of the set of results.

3. The method of claim 1, further comprising tagging the set of results.

4. An apparatus, comprising:
   a network processor interface;
   a central processor interface;
   a protocol determination logic block to determine a protocol type of data in a packet, wherein the protocol determination logic block compares protocol information of the packet in a first pass to predetermined values to produce a first result; and
   a tag select logic block to apply a tag to the packet indicating that the packet should be sent to either the central processor interface or the network processor interface based on the first result, if the first result is negative.

5. The apparatus of claim 4, wherein the protocol determination logic block includes a data register to store the protocol information of the packet.

6. The apparatus of claim 5, wherein the protocol determination logic block includes a comparator to compare contents of the data register to the predetermined values.

7. The apparatus of claim 6, wherein the protocol determination logic block includes a tag selector to select a tag based on the first result.

8. The apparatus of claim 7, wherein the protocol determination logic block includes a protocol code memory to store the predetermined values.

9. The apparatus of claim 8, wherein the network processor interface, central processor interface, and protocol determination logic block reside in a framer.

10. The apparatus of claim 9, further comprising a central processor coupled to the central processor interface of the framer.

11. The apparatus of claim 10, further comprising a network processor coupled to the network processor interface of the framer.

12. The apparatus of claim 11, further comprising a physical link layer coupled to the framer.

13. The apparatus of claim 12 further comprising a software stack coupled to the framer.

14. The apparatus of claim 13 further comprising a host system coupled to the software stack and the network processor.

15. The apparatus of claim 4, wherein the protocol determination logic block compares protocol information of the packet in a second pass to predetermined values to produce a second result, the first result and second result forming a set of results, and the tag select logic block to apply a tag to the packet based on set of results.

16. An apparatus, comprising:
   means for extracting protocol information from a received packet within a framer;
   means for comparing the protocol information in a first pass to predetermined values to produce a first result; and
   means for tagging tile packet based on the first result if the first result is negative;
   the method further comprising means for comparing the protocol information in a second pass to predetermined values, if the first result is positive, to produce a second result, wherein the first and second results form a set of results.

17. The method of claim 16, further comprising means for comparing the protocol information in a third pass to predetermined values to produce a third result of the set of results.

* * * * *

UNITED STATES PATENT AND TRADEMARK OFFICE
CERTIFICATE OF CORRECTION

PATENT NO. : 8,135,029 B1
APPLICATION NO. : 12/192318
DATED : March 13, 2012
INVENTOR(S) : Vasudevan et al.

Page 1 of 1

It is certified that error appears in the above-identified patent and that said Letters Patent is hereby corrected as shown below:

In Column 4, Line 61, delete "control 350," and insert -- control block 350, --, therefor.

In Column 9, Line 26, in Claim 13, delete "claim 12" and insert -- claim 12, --, therefor.

In Column 10, Line 1, in Claim 14, delete "claim 13" and insert -- claim 13, --, therefor.

Signed and Sealed this
Twenty-first Day of August, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO. : 8,135,029 B1
APPLICATION NO. : 12/192318
DATED : March 13, 2012
INVENTOR(S) : Vasudevan et al.

It is certified that error appears in the above-identified patent and that said Letters Patent is hereby corrected as shown below:

In the Claims

| COLUMN | LINE | |
|---|---|---|
| 10 Claim 16 | 18 | "the method" should read --the apparatus-- |
| 10 Claim 17 | 23 | "The method" should read --The apparatus-- |

Signed and Sealed this
Eighteenth Day of February, 2014

Michelle K. Lee
*Deputy Director of the United States Patent and Trademark Office*